(12) United States Patent
Ishikawa et al.

(10) Patent No.: US 8,664,815 B2
(45) Date of Patent: Mar. 4, 2014

(54) FLYWHEEL ENERGY STORAGE DEVICE WITH A HUBLESS RING-SHAPED ROTOR

(75) Inventors: Tetsuya Ishikawa, Saratoga, CA (US); Jin Yi, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 347 days.

(21) Appl. No.: 13/024,196

(22) Filed: Feb. 9, 2011

(65) Prior Publication Data

US 2011/0215592 A1    Sep. 8, 2011

Related U.S. Application Data

(60) Provisional application No. 61/310,616, filed on Mar. 4, 2010.

(51) Int. Cl.
*H02K 7/00* (2006.01)

(52) U.S. Cl.
USPC ............................................. 310/74; 290/1 R

(58) Field of Classification Search
USPC ............................................. 290/1 R; 310/74
See application file for complete search history.

(56) References Cited

U.S. PATENT DOCUMENTS

| | | | | |
|---|---|---|---|---|
| 1,392,349 A | * | 10/1921 | Neuland | 310/98 |
| 3,187,191 A | * | 6/1965 | Baggs | 290/52 |
| 3,845,995 A | * | 11/1974 | Wehde | 310/90.5 |
| 3,888,553 A | * | 6/1975 | Wehde | 310/90.5 |
| 4,870,310 A | * | 9/1989 | Triplett | 310/74 |
| 5,760,508 A | * | 6/1998 | Jennings et al. | 310/74 |
| 5,946,979 A | | 9/1999 | Waagepetersen | |
| 6,160,336 A | * | 12/2000 | Baker et al. | 310/74 |
| 6,175,172 B1 | | 1/2001 | Bakholdin et al. | |
| 6,794,777 B1 | * | 9/2004 | Fradella | 310/74 |
| 7,284,372 B2 | | 10/2007 | Crow | |
| 7,855,465 B2 | * | 12/2010 | Kalev et al. | 290/1 R |

FOREIGN PATENT DOCUMENTS

| | | | | |
|---|---|---|---|---|
| DE | 2544261 A | * | 4/1977 | |
| SU | 601784 A | * | 4/1978 | |
| WO | WO 9200453 A | * | 1/1992 | |

* cited by examiner

*Primary Examiner* — Joseph Waks
(74) *Attorney, Agent, or Firm* — Patterson & Sheridan, LLP

(57) ABSTRACT

A flywheel based energy storage apparatus includes a housing and a hub-less flywheel mounted within the housing. The hub-less flywheel has a mass which is shifted radially outwards from a central axis of the hub-less flywheel thus increasing the energy density of the apparatus. The flywheel includes an outer axially extending annular surface, an inner axially extending surface and two radially extending side surfaces. The inner axially extending surface has a plurality of magnets aligned to form a rotor. A plurality of coils is supported by the housing and is aligned with the rotor to form a motor/generator. A controller controls the motion of the hub-less flywheel to reduce vibrations and controls electrical power transfer to and from the motor/generator.

3 Claims, 3 Drawing Sheets

FLYWHEEL ENERGY STORAGE DEVICE WITH A HUBLESS RING-SHAPED ROTOR

CROSS REFERENCE TO RELATED PATENT APPLICATIONS

This application claims benefit of U.S. Provisional Patent Application Ser. No. 61/310,616, filed Mar. 4, 2010, which is herein incorporated by reference.

BACKGROUND OF THE INVENTION

1. Field of the Invention

Embodiments of the present invention generally relate to energy storage devices and, more particularly, to flywheel energy storage devices.

2. Description of the Related Art

Society's ever increasing need for electricity requires an electrical grid that has a large electrical energy storage capacity. The larger capacity provides for improved grid efficiency and reliability, while providing high quality (sustained voltage) power. One type of energy storage device that provides promise for the electrical industry is flywheel-based energy storage devices.

Flywheel-based energy storage devices store energy in the form of the rotational inertia of one or more flywheels. Some of these devices temporarily store mechanical energy to remove fluctuations in the rotational velocity of an apparatus, such as an internal combustion engine. Other flywheel based energy storage devices have an electric motor to convert electrical energy into rotational mechanical energy, and an electric generator or alternator to convert the rotational mechanical energy into electrical energy. In some devices the electric motor and the electric generator or alternator are combined to form a motor/generator for both converting electrical energy into rotational mechanical energy, and converting the rotational mechanical energy into electrical energy.

One of the drawbacks in all flywheel based energy storage devices is that the capacity to store rotational mechanical energy is directly proportional to the mass of the flywheel. To provide systems capable of storing large amounts of energy, a flywheel with a proportionally large mass must be employed. This low energy to ratio weight (energy density) contributes to increased material cost, increased shipping costs and larger system footprint and weight.

Another concern common to flywheel based energy storage devices is stability, particularly at high rotational speeds. Instability can lead to vibrations resulting in energy loss through increased friction and material stress and fatigue that can ultimately result in structural failure.

As the demand for low-cost electrical energy increases, the efficiency of storing electrical energy in mechanical form takes on greater importance. Therefore, there is a need for an improved flywheel based energy storage apparatus with a higher energy density and increased stability.

SUMMARY OF THE INVENTION

Embodiments described herein generally relate to a flywheel based energy storage apparatus with an increased energy density and greater stability at high rotational speeds.

One embodiment of the invention provides a flywheel based energy storage apparatus. The apparatus includes: a housing; a hub-less flywheel mounted within the housing and rotatable about a horizontal axis; and at least one coil supported by the housing. The flywheel includes: an outer axially extending annular surface; an inner axially extending surface; and two radially extending side surfaces. One of the inner or outer axially extending surfaces include a plurality of magnets aligned to form a rotor and the at least one coil and the rotor are aligned to form a motor/generator.

In a further embodiment, the invention provides a flywheel based energy storage apparatus. The apparatus includes: a housing; a hub-less, ring-shaped flywheel mounted within the housing and rotatable about a horizontal axis; a primary flywheel support for supporting the flywheel when the flywheel is spinning at and above a predetermined rotational speed; a secondary flywheel support for supporting the flywheel when the flywheel is spinning at less than the predetermined rotational speed; a plurality of coils; a plurality of flywheel position and rotational speed sensors; and a control system.

The housing includes: a base; a plurality of outer frame members supported on the base and forming an outer perimeter of the apparatus; and a plurality of inner cross frame members connected to and reinforcing some of the outer frame members.

The flywheel includes: an outer axially extending annular surface; an inner axially extending annular surface comprising a plurality of magnets aligned to form a rotor; and two radially extending side surfaces.

The primary flywheel support includes: a plurality of brackets attached to the plurality of outer frame members; a plurality of side air bearings mounted on the brackets and supporting the radially extending side surfaces of the flywheel; a plurality of radial air bearings mounted on the brackets and supporting the outer axially extending annular surface of the flywheel; a compressed air supply; and a plurality of air control valves for selectively supplying air from the compressed air supply to the plurality of air bearings.

The secondary flywheel support includes a plurality of parking bearings. Each parking bearing has: a frame mounted to one of the plurality of outer frame members; and a plurality of rollers mounted on the frame and supporting the outer axially extending annular surface of the flywheel when the flywheel is spinning at less than the predetermined rotational speed.

The plurality of coils are mounted on the plurality of inner cross frame members of the housing, adjacent to the inner axially extending annular surface of the flywheel. The plurality of coils and the rotor are aligned to form a motor/generator, while the control system controls electrical power transfer to and from the motor/generator and the plurality of air control valves, based on signals received from the plurality of flywheel position and rotational speed sensors.

Another embodiment of the invention provides a method for energy storage. The method includes rotating a hub-less flywheel about a horizontal axis within a housing. The flywheel includes: an outer axially extending annular surface; an inner axially extending surface; and two radially extending side surfaces. One of the inner or outer axially extending surfaces includes a plurality of magnets aligned to form a rotor. The method further includes: supporting at least one coil on the housing, the at least one coil and the rotor being aligned to form a motor/generator; and controlling electrical power transfer to and from the motor/generator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
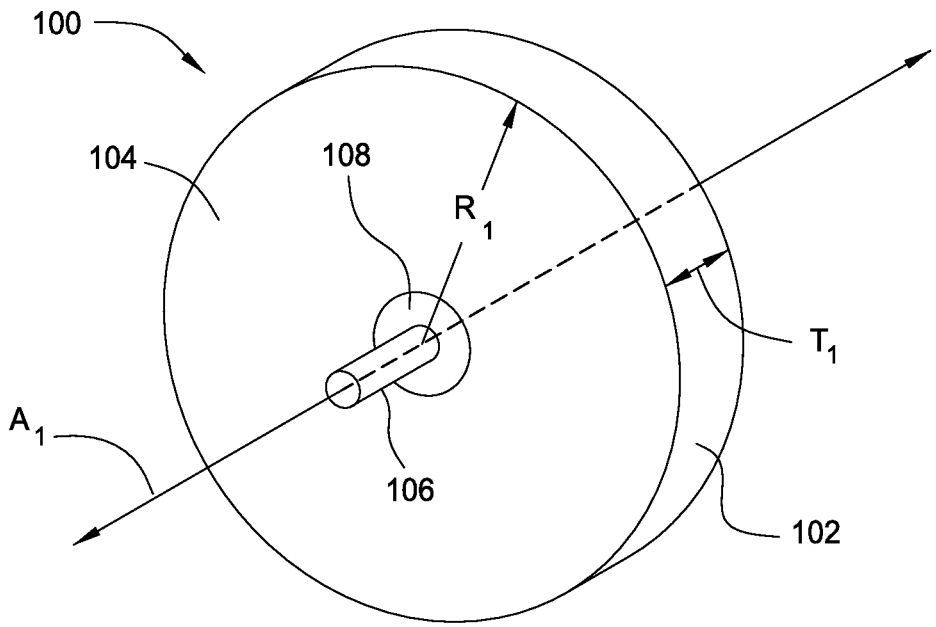
FIG. 1A is a schematic isometric view of one embodiment of a flywheel including a central hub.

Embodiments described herein generally relate to flywheel based energy storage apparatus and methods. One embodiment of a flywheel 100 including a central hub is illustrated in FIG. 1A. The central hub of the flywheel 100 generally includes an axle 106 that is fixedly attached to a support frame or housing (not shown). The hub further includes a bearing or bushing 108 for rotatable mounting the flywheel 100 to the axle 106. In alternate embodiments, the axle 106 may be fixedly attached to the flywheel 100, and the bushing 108 may be provided between the axle 106 and the housing. In either embodiment, flywheel 100 is rotatable mounted to a housing, so that it may freely rotate about axis $A_1$. The flywheel 100 further includes an outer axially extending annular surface 102 and two radially extending side surfaces 104 (one of which is shown in FIG. 1A).

The flywheel 100 is generally in the form of a solid wheel and has a radius $R_1$ and a thickness $T_1$. The flywheel 100 also is usually connected to or includes some means for driving the flywheel, such as an electrical motor (not shown), and means to generate electricity from the flywheel's rotational inertia, such as an electrical generator/alternator (not shown). In some embodiments, the motor and generator are combined to form a motor/generator.

The energy stored by the flywheel 100 is directly proportional to the rotational inertia (I) of the flywheel. The rotational inertia (I) of a rotating body is the summation of the mass m of each particle of the flywheel times the square of the distance r between the particle and the axis $A_1$, and can be expressed as:

$$I = \Sigma m_i r_i^2$$

As can be seen in the formula, the further a particle of the flywheel 100 is from the axis $A_1$, the more rotational inertia (and energy) it can store. According to embodiments of the invention, a flywheel's rotational inertia is increased by increasing the amount of mass located near the outer axially extending annular surface 102 (outer perimeter) which more than compensates for decreasing the amount of mass located near the axle 106 (center) of the flywheel. This can be accomplished by increasing the density of material from the center to the outer perimeter of the flywheel, or by providing less material in the form of struts or supports between the hub of the flywheel and a solid outer portion of the flywheel. One drawback in both of these embodiments of a hubbed flywheel, is that the inner portions must be strong enough to support the outer portions on the hub. Thus, the hubbed flywheel 100 is limited in the maximum energy density available.

Figure 1B:
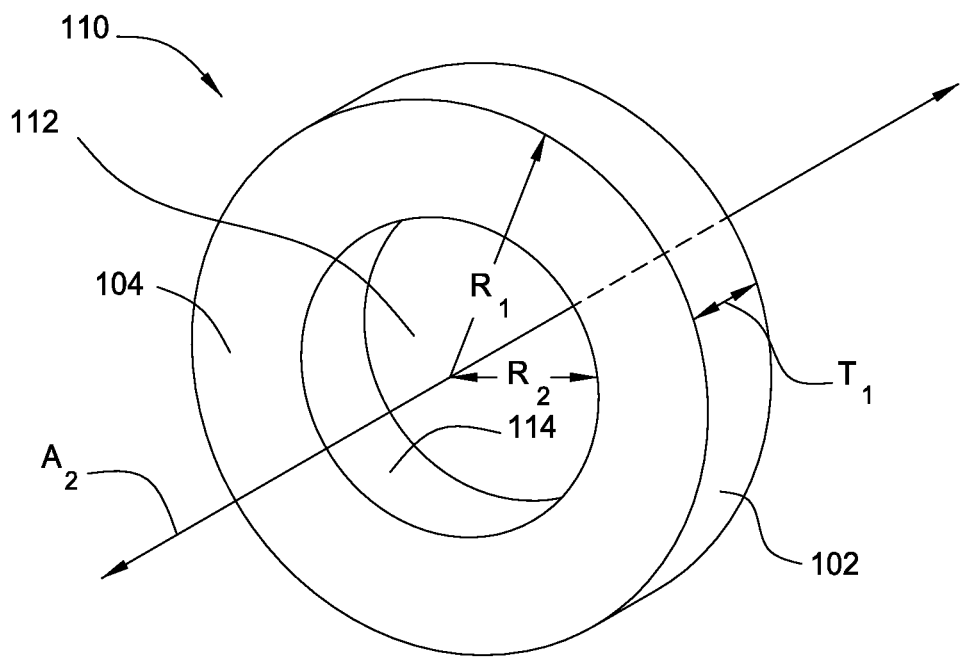
FIG. 1B is a schematic isometric view of a hub-less flywheel of the present invention, according to embodiments described herein.

One embodiment of a hub-less flywheel 110 including a central opening 112 is illustrated in FIG. 1B. The flywheel 110 further includes an outer axially extending annular surface 102, an inner axially extending surface 114 and two radially extending side surfaces 104 (one of which is shown in FIG. 1B). The flywheel 110 is generally in the form of a ring and has an outer radius $R_1$, an inner radius $R_2$ and a thickness $T_1$. The flywheel 110 is connected to or includes some means for driving the flywheel, such as an electrical motor (not shown), and means to generate electricity from the flywheel's rotational inertia, such as an electrical generator/alternator (not shown). In some embodiments, the motor and generator are combined to form a motor/generator.

By providing the flywheel 110 with the central opening 112, the mass of the flywheel 110 is shifted toward the outer axially extending annular surface 102 (outer perimeter), such that the amount of mass located near the axis $A_1$ (center) of the flywheel 110 is zero. This results in a higher energy density of the flywheel 110 over the flywheel 100. In other words, for flywheels having equal mass, the flywheel 110 will have a greater rotational inertia then the flywheel 100. The hub-less flywheel 110 requires a support system (not shown) for supporting the flywheel 110 on one or more of the outer axially extending surface 102, the inner axially extending surface 114 and the two radially extending side surfaces 104.

Figure 2:
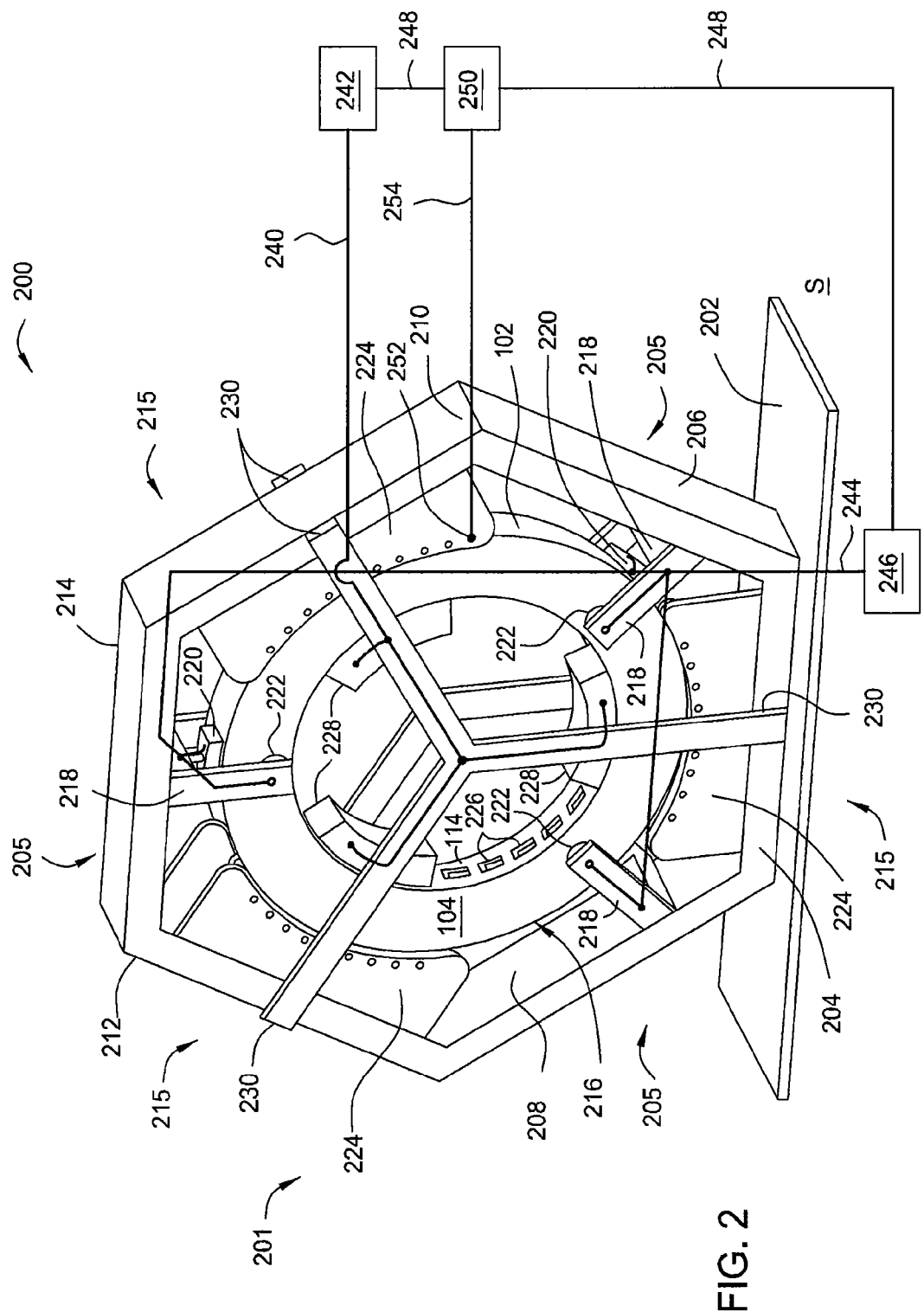
FIG. 2 is a schematic isometric view of one embodiment of a flywheel based energy storage apparatus of the invention.

FIG. 2 is a schematic isometric view of one embodiment of a flywheel based energy storage apparatus 200. The flywheel based energy storage apparatus 200 includes a housing 201. The housing 201 has a base 202 for supporting the housing 201 on a surface S. The base 202 may include a suspension (not shown) either active or passive, for reducing vibrations of the apparatus 200 and/or reducing transmission of vibrations to the surface S. In the embodiment of FIG. 2, the housing 201 includes a plurality of outer frame members supported on the base and forming an outer perimeter of the apparatus.

In one embodiment, the plurality of outer frame members includes a bottom frame member 204 that is attached to and supported by the base 202. Two lower side frame members 206 and 208 are attached to and supported by the bottom frame member 204. Two upper side frame members 210 and 212 are attached to and supported by the two lower side frame members 206 and 208. A top frame member 214 is attached to and supported by the upper side frame members 210 and 212. Three inner cross frame members 230 are connected in a Y configuration and further connect to the outer frame members 204, 210 and 212 to provide reinforcement and mounting surfaces as described below.

While the housing is shown as an open frame arrangement in FIG. 2, it should be understood that other housing types, such as closed housings may be used in further embodiments of the invention. Closed housings that are hermetically sealed, as well as housings that maintain an internal vacuum for reduced air friction, are also contemplated.

In the embodiment of FIG. 2, a hub-less, ring-shaped flywheel 216 is mounted within the housing. The flywheel 216 is similar in structure to flywheel 110 of FIG. 1B and includes an outer axially extending annular surface 102, an inner axially extending annular surface 114 and two radially extending side surfaces 104.

The flywheel 216 is generally in the form of a ring and has an outer radius $R_1$, an inner radius $R_2$ and a thickness $T_1$, as shown in FIG. 1B and described above with reference to flywheel 110. The flywheel 216 also includes a plurality of magnets 226 aligned on the inner axially extending annular surface to form a rotor. In other embodiments, the plurality of magnets 226 may be mounted on any of the other surfaces 102 or 104 of the flywheel 216.

In one embodiment, the flywheel 216 is formed of high strength fiber composite material such as carbon or glass fiber composites. The high strength fiber composite material allows for a high rotation speed of the flywheel 216, thus increasing the energy stored by the flywheel 216. The flywheel 216, as shown in FIG. 2, is set up vertically, such that it rotates about a horizontal axis. While other arrangements are possible, the horizontal rotation axis has been found to reduce undesired forces that may be coupled to surfaces (such as surface S) to which the base 202 is mounted.

The apparatus 200 includes a flywheel support system. The flywheel support system includes a primary flywheel support system 205 for supporting the flywheel 216 when the flywheel is spinning at and above a predetermined rotational speed (operational speed) and a secondary flywheel support system 215 for supporting the flywheel 216 when the flywheel is spinning at less than the predetermined rotational speed (parking speeds).

The primary flywheel support system 205 provides active support for the flywheel 216 at operating speeds. In the embodiment of FIG. 2, the primary flywheel support includes a plurality of brackets 218 attached to the outer frame members 206, 208 and 214. A plurality of side air bearings 222 are mounted on the brackets 218 and support the radially extending side surfaces 104 of the flywheel 216. A plurality of radial air bearings 220 are mounted on the brackets 218 and support the outer axially extending annular surface 102 of the flywheel 216.

A plurality of air control valves (shown as a block 246 of control valves in FIG. 2) selectively supplies air from a compressed air supply (see FIG. 2 and FIG. 3) to the plurality of air bearings based on signals received from a controller 250 via electrical control lines 248. While three brackets 218 and associated air bearings are shown in FIG. 2, more brackets 218 and additional air bearings may be provided. Further, while only two side air bearings and one radial air bearing are mounted to each bracket 218, in the embodiment of FIG. 2, additional side air bearings and radial air bearings may be provided, particularly for larger flywheels.

Figure 3:
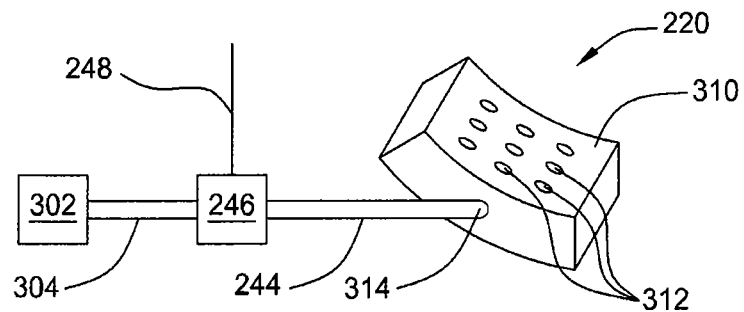
FIG. 3 is a schematic isometric view of a radial air bearing of the flywheel based energy storage apparatus of FIG. 2, according to embodiments described herein.

FIG. 3 shows a schematic isometric view of one embodiment of the radial air bearing 220 and associated components. The radial air bearing 220 has a surface 310 that faces the outer axially extending annular surface 102 of the flywheel 216. In one embodiment, the surface 310 has a radius of curvature slightly larger than the outer radius $R_1$ of flywheel 216, such that a uniform clearance is maintained between the surface 310 and the outer axially extending annular surface 102 of the flywheel 216. A plurality of air ports 312 are provided in the surface 310 to supply air to form the air bearing between the surface 310 and the outer axially extending annular surface 102 of the flywheel 216. The radial air bearing 220 has an input port 314 that is connected to a control valve 246 via pneumatic lines 244. The control valve 246 is connected to a supply of compressed air 302 via pneumatic lines 304. The controller 250 (FIG. 2) provides signals to control the control valves 246 via electrical control lines 248, as described in greater detail below.

Figure 4:
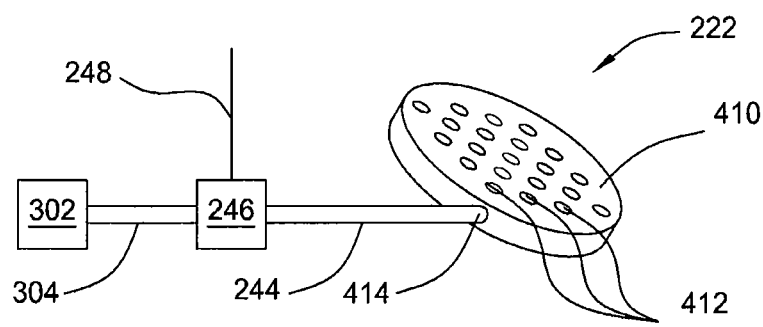
FIG. 4 is a schematic isometric view of an axial air bearing of the flywheel based energy storage apparatus of FIG. 2, according to embodiments described herein.

FIG. 4 shows a schematic isometric view of one embodiment of the side air bearing 222 and associated components. The side air bearing 222 has a surface 410 that faces one of the radially extending side surfaces 104 of the flywheel 216.

In one embodiment, the surface 410 and the radially extending side surfaces 104 are relatively planar, such that a uniform clearance is maintained between the surface 410 and the radially extending side surface 104. A plurality of air ports 412 are provided in the surface 410 to supply air to form the air bearing between the surface 410 and the radially extending side surface 104 of the flywheel 216. The side air bearing 222 has an input port 414 that is connected to a control valve 246 via pneumatic lines 244. The control valve 246 is connected to a supply of compressed air 302 via pneumatic lines 304. The controller 250 (FIG. 2) provides signals to control the control valves 246 via electrical control lines 248, as described in greater detail below.

The secondary flywheel support system 215 (FIG. 2) provides support at lower flywheel speeds, particularly at spin-up and spin-down periods. The secondary flywheel support includes a plurality of parking bearings 224 mounted to frame members 204, 210 and 212.

Figure 5:
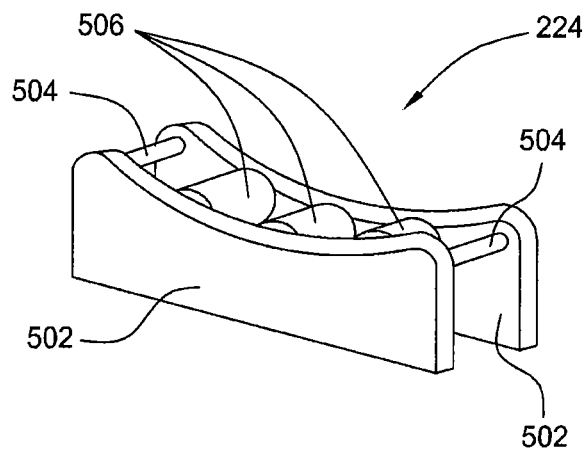
FIG. 5 is a schematic isometric view of a parking roller bearing of the flywheel based energy storage apparatus of FIG. 2, according to embodiments described herein.

Further details of the parking bearings 224 are shown in FIG. 5. The parking bearings 224 include a frame 502 mounted to one of the outer frame members. The frame 502 includes two halves that are connected by reinforcing rods 504. A plurality of rollers 506 are mounted to the frame and support the outer axially extending annular surface 102 of the flywheel 216 when the flywheel is spinning at lower flywheel speeds. The parking bearings 224 are mounted close enough to the flywheel 216, such that the flywheel 216 will not contact components of the primary flywheel support when the primary flywheel support is deactivated and the flywheel 216 is supported by the parking bearings 224, thereby avoiding damage to those components.

Further, the parking bearings 224 are mounted far enough from the flywheel 216, such that the flywheel 216 will not contact components of the secondary flywheel support when the primary flywheel support is activated and supporting the flywheel 216 to thereby reduce friction imparted to the flywheel 216 by the parking bearings 224. In the embodiment of FIG. 2, the lower parking bearing 224 that is attached to the bottom frame member 204, supports the weight of the flywheel 216, while the upper parking bearings 224 keep the flywheel 216 aligned within the housing 201.

A plurality of coils 228 are mounted on the plurality of inner cross frame members 230. The plurality of coils 228 are mounted adjacent to the inner axially extending annular surface 114 of the flywheel 216, such that the plurality of coils and the plurality of magnets 226 of the rotor are aligned to form a motor/generator. In one embodiment, the top two coils are actively controlled to maintain the distance between the coils 228 and the plurality of magnets 226 of the rotor using magnetic levitation, as described further below. The plurality of coils 228 are electrically connected to a coil control module 242 by wires 240. In one embodiment, each coil 228 is connected to the coil control module 242 by two of the wires 240. The coil control module 242 controls both AC and DC current through the coils 228 to drive and control the flywheel in the motor mode, and to deliver electrical power to external loads (not shown) in the generator mode.

To sense the location and rotation of the flywheel 216 relative to the housing, the energy storage apparatus 200 includes a plurality of flywheel position and rotational speed sensors 252 (one shown). The plurality of flywheel position and rotational speed sensors, in one embodiment, include sensors that provides signals indicative of the rotational speed of the flywheel 216 as well as the radial and axial position of the flywheel 216 relative to the housing. The sensors 252, may be magnetic (such as Hall effect devices), optical, mechanical or a combination of different types of sensors. The sensors 252 provide the signals to the controller 250 via signal lines 254.

The controller 250 receives the signals from sensors 252, and together with the sensors 252, coil control module 242 and control valve(s) 246 forms a feedback control system. The control system controls electrical power transfer to and from the motor/generator and the plurality of air control valves 246, based on signals received from the plurality of flywheel position and rotational speed sensors 252. The control system thereby maintains the proper position of the flywheel 216 within the housing by controlling the plurality of air control valves 246 based on the positional sensors 252. In some embodiments, the primary flywheel support system may be provided by coils 228, wherein coil control module 242, provides a current to coils 228 to magnetically levitate the flywheel 216 through interaction with magnets 226. In magnetically levitated embodiments, the air bearings 220 and 222 and their associated components may not be required.

While the foregoing is directed to embodiments of the present invention, other and further embodiments of the invention may be devised without departing from the basic scope thereof, and the scope thereof is determined by the claims that follow.

What is claimed is:

1. A flywheel based energy storage apparatus, comprising:
   a housing;
   a hub-less, ring-shaped flywheel mounted within the housing and rotatable about a horizontal axis, wherein the flywheel comprises a plurality of magnets aligned to form a rotor;
   a flywheel support system; and
   a plurality of coils, the plurality of coils and the rotor being aligned to form a motor/generator, wherein the flywheel support system comprises:
   a primary flywheel support for supporting the flywheel when the flywheel is spinning at and above a predetermined rotational speed; and
   a secondary flywheel support for supporting the flywheel when the flywheel is spinning at less than the predetermined rotational speed and, wherein the primary flywheel support comprises:
   a plurality of brackets attached to the plurality of outer frame members;
   a plurality of side air bearings mounted on the brackets and supporting the radially extending side surfaces of the flywheel;
   a plurality of radial air bearings mounted on the brackets and supporting the outer axially extending annular surface of the flywheel;
   a compressed air supply; and
   a plurality of air control valves for selectively supplying air from the compressed air supply to the plurality of air bearings.

2. The apparatus of claim 1, wherein the secondary flywheel support comprises a plurality of parking bearings mounted on the housing for supporting the flywheel.

3. The apparatus of claim 2, wherein each parking bearing comprises:
   a frame mounted to one of the plurality of outer frame members; and
   a plurality of rollers mounted on the frame and supporting the outer axially extending annular surface of the flywheel when the flywheel is spinning at less than the predetermined rotational speed.

* * * * *